Aug. 9, 1938.  T. E. BOYER  2,126,366
WIPER PACKING GLAND
Filed May 11, 1936
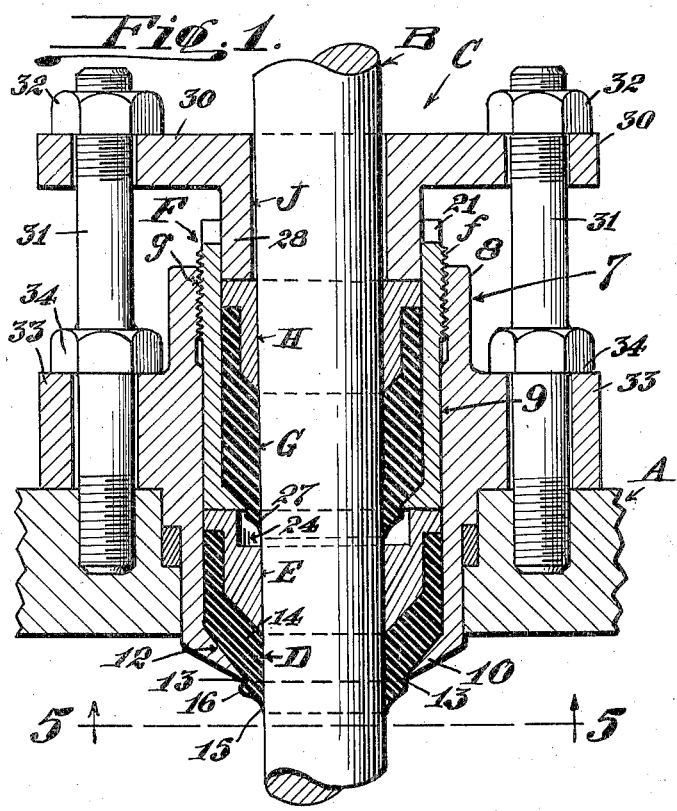
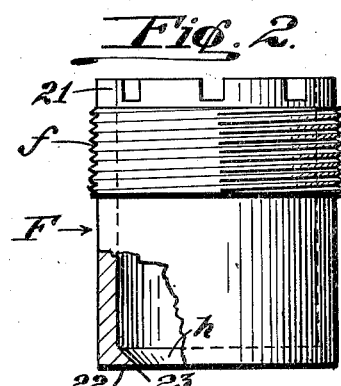
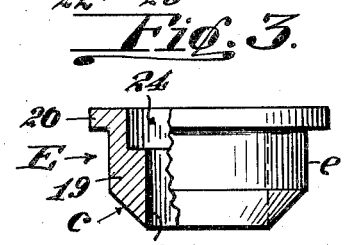
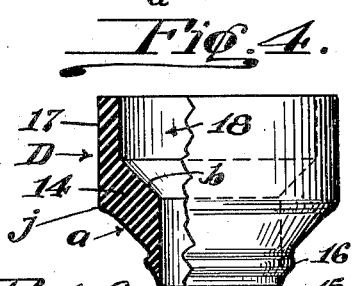
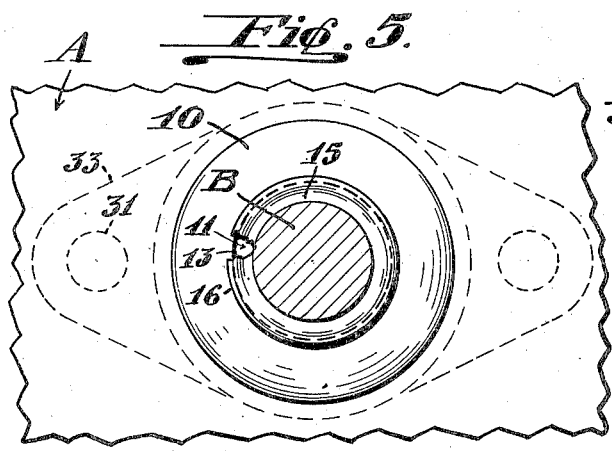
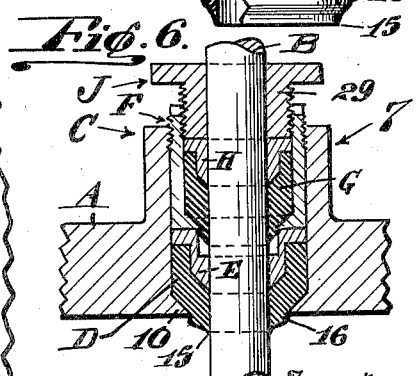
Inventor:
Tanner E. Boyer;
By
R. S. Berry
Attorney Patented Aug. 9, 1938

2,126,366

UNITED STATES PATENT OFFICE 2,126,366

WIPER PACKING GLAND

Tanner E. Boyer, Bell, Calif., assignor of one-half to Lester P. Stockman, Los Angeles, Calif.

Application May 11, 1936, Serial No. 79,043

7 Claims. (Cl. 286—35)

This invention relates to a packing gland and more particularly pertains to a combined packing gland and wiper for use in packing reciprocating shafts in pumps and the like.

An object of the invention is to provide a packing gland which is so formed as to serve the double purpose of preventing leakage around a reciprocal shaft and also to act as a wiper in effecting the removal of granular solids and grit from the shaft as the latter advances into the gland so as to obviate abrasive action of such particles on the internal structure of the gland, thus increasing the wearing qualities of the gland with a consequent decrease in frequency of adjustment thereof in compensating for wear of the packing.

Another object is to provide a unitary combined resilient wiper and packer for packing glands together with a mounting therefor whereby the wiping element thereof will be unconfined other than at the base portion thereof so as to bear under its tension against the moving surface of a reciprocal shaft and thereby reduce to a minimum frictional resistance of the wiper to the reciprocation of the shaft and at the same time assist in maintaining the gland leak proof.

Another object is to provide a construction in the packing and gland whereby compression forces applied to the packing element will not compress the element throughout as is the case with packing glands now generally in use, but excessive compression of the packing will be prevented in a fashion such as to minimize if not to preclude the possibility of excessively tightening the packing against the reciprocal shaft.

A further object is to provide a packing gland embodying a construction affording extrusion of the inner end portion of the packing element into a space such as to allow free working thereof.

Another object is to provide an arrangement in the packing gland whereby a plurality of combined wiping and packing elements may be effectively arranged in series within the gland so as to provide a multiple of spaced wipers operable on the length of the reciprocal shaft extending through the gland.

With the foregoing objects in view together with such other objects and advantages as may subsequently appear, the invention is carried into effect as illustrated by way of example in the accompanying drawing, in which:

Fig. 1 is a view in vertical section partly in elevation of the gland showing the parts in their relatively assembled position; to effect a combined packing and wiping action on a reciprocal shaft;

Fig. 2 is a view in side elevation of an adjustment sleeve employed in the gland;

Fig. 3 is a view in elevation partly in section of a crowding ring employed in association with the sleeve shown in Fig. 2;

Fig. 4 is a view in elevation partly in section of a resilient packing and wiping element;

Fig. 5 is an inverted plan view and section taken on the line 5—5 of Fig. 1;

Fig. 6 is a vertical section depicting a modified form of the gland.

Referring to the drawing more specifically in which corresponding reference characters indicate corresponding elements throughout the several views A indicates generally the end wall of a pump cylinder or similar structure, B designates a reciprocal shaft extending through the wall A, and C denotes generally a gland interposed between the shaft B and the wall A.

The gland C embodies an annular wall portion 7 which may comprise a tube 8 detachably mounted on the wall A as shown in Fig. 1, or may constitute an integral part of the wall A as shown in Fig. 6. In either event the annular wall 7 affords a cylinder the inner periphery 9 of which is spaced from the outer periphery of the shaft B in concentric relation thereto.

In carrying out the invention the lower end of the annular wall 7 is formed with an inwardly projecting marginal flange 10 the inner edge of which is spaced from the outer periphery of the shaft B to form an annular gap 11 between the flange 10 and the shaft B. The upper or inner face 12 of the flange 10 is beveled to incline downwardly from its intersection with the cylindrical surface 9 to a thin tapered edge 13 at the inner margin of the flange 10.

In the construction shown in Figs. 1 and 5 the flange 10 is formed on the lower end of the tube 8 and in the construction shown in Fig. 6 is formed on the portion of the wall A extending in continuation of the wall 7. In either event the annular gap 11 opens to the under side of the wall A, that is to the interior of the pump cylinder.

A combined packing and wiping element D is provided for positioning around the shaft B in the lower portion of the wall 7 and which element embodies an annular wall portion 14 for encircling the shaft B in slidable contact therewith, and which wall portion has an inclined or tapered lower end portion $a$ formed to seat on and conform to the inclined upper face 12 of the flange 10; the tapered lower end *a* of the wall 14 terminating in a thin flexible lip 15 arranged to protrude through the gap 11, which lip terminates in a knife-edge so that its margin will act as a scraper on reciprocating the shaft B longitudinally relative thereto. An annular bead 16 is formed at the base of the lip 15 and protrudes from the inclined end portion *a* intermediate the base and tip thereof to overlie the margin 12 of the flange 10 and which bead serves as a reinforcement at the base of the lip 15 to stiffen the latter against outward curling and also to afford a seal along the margin of the flange 10.

Formed on the wall 14 is an upstanding annular flange 17 the outer periphery of which conforms to the cylindrical surface 9 of the wall 7 and the inner periphery of which is spaced from the shaft B. A downwardly inclined face *b* is provided interiorly of the element D leading from the base of the flange 17 to the inner periphery of the body portion 14. The upper end of the element D is thus formed with a cavity 18 in which is positioned a crowding ring E embodying an annular wall 19 having a tapered lower end *c* which seats on the inclined face *b*. The ring E also has an outwardly projecting marginal flange 20 on its upper end which seats on the upper end of the upstanding rim flange 17 of the element D. The inner periphery *d* of the ring E slidably conforms to the outer periphery of the shaft B, and the outer periphery *e* thereof conforms to the inner periphery of the flange 17 on the element D.

The wiping and packing element D is formed of an elastic, resilient and compressible material, such as rubber or rubber composition, such that the body portion 14 thereof will serve as a packing while the lip 15 will function as a wiper and also assist in maintaining the gland leak proof.

Extending interiorly of the wall 7 in threaded engagement therewith is a cylindrical sleeve F the outer periphery of which conforms to the inner periphery of the wall 7 and the inner periphery of which is spaced from the shaft B, the sleeve F being formed adjacent its upper end with screw threads *f* engaging threads *g* on the wall 7. The lower end of the sleeve F is formed to seat upon the upper face of the follower E in slidable contact therewith. The upper end of the sleeve F is formed with castellations 21 which extend above the upper margin of the wall 7 and afford a means for engaging the sleeve with a suitable tool to turn the sleeve to advance or retract it on its threaded connection with the wall 7.

The lower end of the sleeve F is formed with an inturned marginal flange 22 having a downwardly and inwardly inclined upper face, and terminating in a tapered margin 23 spaced from the shaft B, to form a gap between the latter and the flange 22.

The upper end of the crowding ring E is formed with a counterbore 24 the side wall of which is offset outwardly from the margin 23 of the flange 22 on the sleeve F. Arranged interiorly of the sleeve F is a combined packing and wiping element G, shaped similar to the element D; it having an end wiper lip 27 protruding below the flange 22 on the sleeve F into the counterbore 24 of the crowding ring E.

A crowding ring H substantially corresponding to the crowding ring E encompasses the shaft B above the packing element G and seats on the upper end of the latter, and bearing on the ring H is a packing adjustment ring J which may be a slip ring 28 as shown in Fig. 1, or may comprise a threaded sleeve 29 screwed in the sleeve F as shown in Fig. 6.

In the construction shown in Fig. 1 the ring 28 is formed with flanges 30 through which extend bolts 31 screwed into the wall A and having nuts 32 screwed on their outer ends and bearing on the flanges 30 for effecting adjustment of the ring J in a conventional fashion. The bolts 31 pass through lugs 33 on the tube 8 and have shoulders 34 abutting on the lugs 33 to clamp the latter on the upper or outer face of the wall A.

The packing elements D and G are each formed in the fashion shown in Fig. 4, and include a downwardly projecting bead *j* at the intersection of the inclined face of the tapered lower end *a* and the cylindrical outer periphery thereof, which bead *j* serves on compressing the packing body against its inclined seat to effect an inward lateral displacement of the material of the packing element against the shaft B such as to enhance the packing action of the element.

In the operation of the invention adjustment of the packing element D is effected by rotating the sleeve F on its screw connection with the wall 7 to advance the sleeve F to tighten the packing, or to retract the sleeve to loosen the packing. In advancing the sleeve F the lower or inner end thereof bears on the crowding ring E in sliding contact therewith so that no torque will be applied to the packing D on rotation of the adjusting sleeve.

On advancing the crowding ring E in the packing element D the tapered end *c* of the crowding ring acts to compress the body portion 14 of the packing element against the flange 10, while the flange 20 on the crowding ring bearing on the upstanding flange 17 of the packing element compresses the latter longitudinally and forces the inner peripheral wall of the portion 14 into packing contact with the shaft B. The packing element D will thus be under a state of compression throughout the portion thereof above the flange 10. The lip 15 being unconfined and extruding into space below the flange 10 will bear upon the shaft in wiping contact therewith under its inherent tension; the lip being slightly extended and placed under tension on positioning it around the shaft B by reason of the inner periphery of the lip being of a diameter slightly less than the diameter of the shaft B. In like fashion the packing element G and crowding ring H operate in the sleeve F with the lip 27 of the element G unconfined and free to flex in the cavity 24.

By the construction set forth the lips 15 and 27 will function to wipe the surfaces of the shaft B contacted thereby during reciprocation of the shaft; this wiping action serving to clean the shaft of granular solids so as to prevent such solids from working into the gland and effecting abrasive action thereon; the lips 15 and 27 also assisting in preventing the escape of liquid along the shaft B and thus aiding in maintaining the gland leak proof.

By the provision of the wiping lip in the manner herein set forth in conjunction with the packing body and the tapered end of the crowding ring, simultaneous adjustment of the wiper and packing elements is accomplished by effecting longitudinal movement of the crowding ring.

I claim:

1. In a gland for packing reciprocal shafts, an annular wall encircling the shaft in spaced relation thereto, an inturned marginal flange on said wall formed with a downwardly inclined upper face, said flange terminating in spaced relation to the shaft, a combined packing and wiping element seating on said flange having a marginal wiping lip extruded beneath said flange in wiping contact with the shaft, and means for crowding said element into packing contact with the shaft.

2. In a gland for packing reciprocal shafts, an annular wall encircling the shaft in concentric spaced relation thereto, an inturned marginal flange on the lower end of said wall having a downwardly inclined upper face terminating in a beveled margin spaced concentrically from the shaft, a resilient annular packing element seating on said flange with its inner periphery contacting the shaft, a marginal flexible lip on said element projecting through the gap between said flange and shaft and contacting the shaft in wiping engagement therewith, an annular bead at the base of said lip overlying the lower margin of said flange, and means for crowding said packing element into packing relation to said shaft.

3. In a gland for reciprocal shafts, an annular wall encircling the shaft in concentric spaced relation thereto, an inturned marginal flange on the lower end of said wall having a downwardly inclined upper face terminating in a beveled margin spaced concentrically from the shaft, a resilient annular packing element seating on said flange with its inner periphery contacting the shaft, a marginal flexible lip on said element projecting through the gap between said flange and shaft and contacting the shaft in wiping engagement therewith, an annular bead at the base of said lip overlying the lower margin of said flange, said packing element having a recessed upper portion formed with a downwardly and inwardly inclined wall, a crowding ring encircling the shaft and extending into said recess, said crowding ring having a tapered end seating on the inclined face of said recess, and means for adjusting said crowding ring to press said packing element against said flange.

4. In a gland for reciprocal shafts, an annular wall encircling the shaft in concentric spaced relation thereto, an inturned marginal flange on the lower end of said wall having a downwardly inclined upper face terminating in a beveled margin spaced concentrically from the shaft, a resilient annular packing element seating on said flange with its inner periphery contacting the shaft, a marginal flexible lip on said element projecting through the gap between said flange and shaft and contacting the shaft in wiping engagement therewith, an annular bead at the base of said lip overlying the lower margin of said flange, said packing element having a recessed upper portion formed with a downwardly and inwardly inclined wall, a crowding ring encircling the shaft and extending into said recess, said crowding ring having a tapered end seating on the inclined face of said recess, and an adjustment sleeve having screw engagement with said annular wall abutting against said crowding ring.

5. In a gland for reciprocal shafts, an annular wall encircling the shaft in concentric spaced relation thereto, an inturned marginal flange on the lower end of said wall having a downwardly inclined upper face terminating in a beveled margin spaced concentrically from the shaft, a resilient annular packing element seating on said flange with its inner periphery contacting the shaft, a marginal flexible lip on said element projecting through the gap between said flange and shaft and contacting the shaft in wiping engagement therewith, an annular bead at the base of said lip overlying the lower margin of said flange, said packing element having a recessed upper portion formed with a downwardly and inwardly inclined wall, a crowding ring encircling the shaft and extending into said recess, said crowding ring having a tapered end seating on the inclined face of said recess, an adjustment sleeve having screw engagement with said annular wall abutting against said crowding ring, said sleeve having a cylindrical inner periphery spaced concentrically from the shaft and being formed with an inclined marginal flange on its lower end the margin of which is spaced from said shaft, said crowding ring having a counterbore adjacent the lower end of said sleeve, a packing element arranged in said sleeve having an end portion extruded into said counterbore and means for crowding said last named packing element into packing engagement with the shaft.

6. A packing element comprising an annular resilient body formed with a tapered end portion having an inclined face on its interior, a cylindrical end flange leading longitudinally from the base of said tapered end portion, and a circumferentially extending bead on the face of said tapered end portion and the intersection of the enlarged end thereof and the outer periphery of said flange.

7. A stuffing box comprising a body member having a bore therethrough, said bore having threads for a portion of the length thereof, the inner end of said bore being of gradually reducing configuration, a compressible sleeve within said bore having a tapering inner end coincident with the taper of the bore, said sleeve adjacent the outer end thereof having a cylindrical bore extending inwardly from the outer end and a tapering bore merging with said cylindrical bore, an inner sleeve engaging within said compressible sleeve at the outer end thereof, said inner sleeve having a tapering inner end coincident with the tapering bore of the compressible sleeve, an annular flange carried by said inner sleeve engaging against the outer end of said compressible sleeve, and a nut member engaging the threads of said body and having the inner end thereof engaging against the outer end of said inner sleeve whereby to compress said compressible sleeve against the tapering inner end of said body.

TANNER E. BOYER.